Roy C. Potts,
INVENTOR.

BY Ross O. Kinney

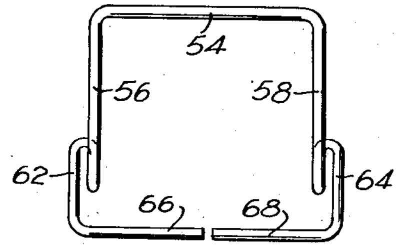
Fig. 7
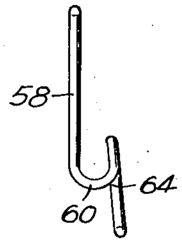
Fig. 8
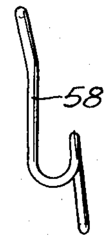
Fig. 9
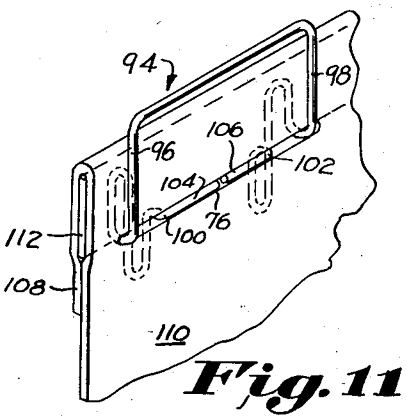
Fig. 11
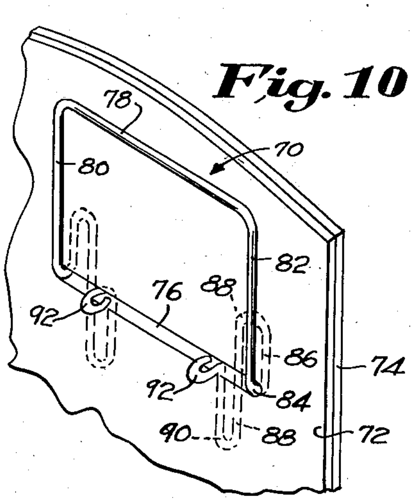
Fig. 10
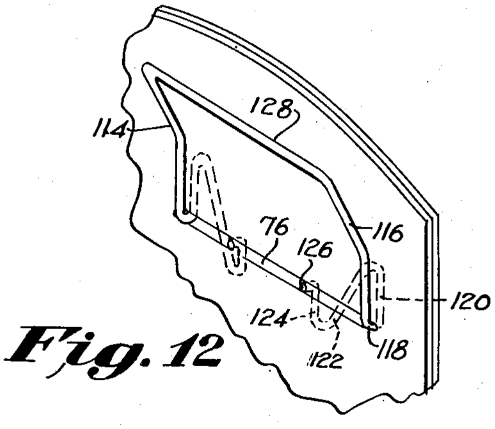
Fig. 12
Fig. 12-A
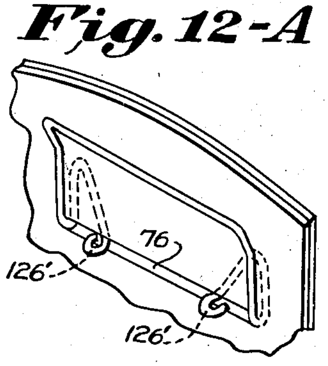
Roy C. Potts,
INVENTOR.
BY [signature]

BOX HANDLE AND FASTENING MEANS

Filed Jan. 23, 1948 5 Sheets-Sheet 3

Roy C. Potts,
INVENTOR.

BY Ross K. Harvey

Roy C. Potts,
INVENTOR.

BY Ross C. Harvey

Roy C. Potts,
INVENTOR.

BY Ross A Kenney

Patented Sept. 30, 1952

2,612,308

UNITED STATES PATENT OFFICE 2,612,308

BOX HANDLE AND FASTENING MEANS

Roy C. Potts, Takoma Park, D. C.

Application January 23, 1948, Serial No. 3,855

11 Claims. (Cl. 229—52)

Figures 1, 2, 3, 4, 5, 6:
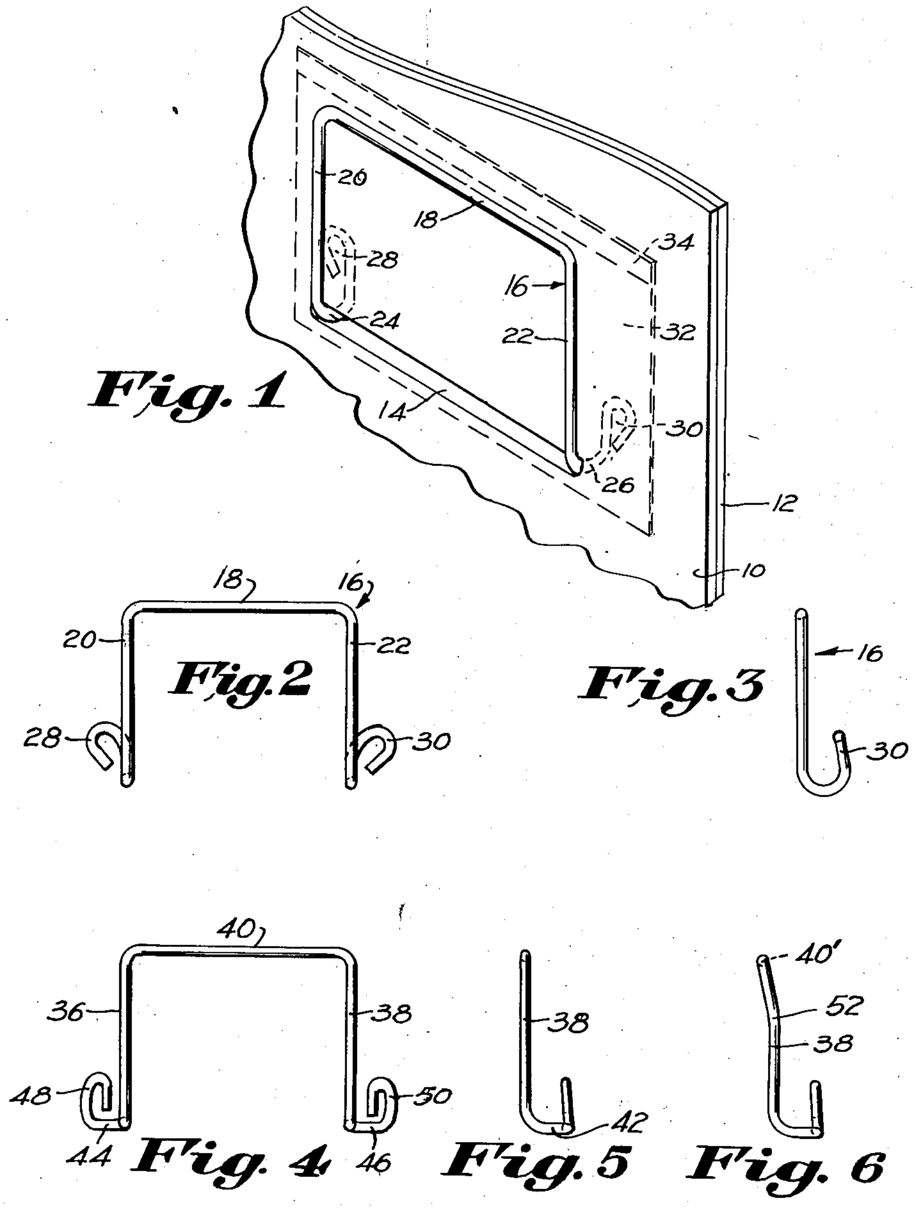

This invention relates to containers, particularly to fibreboard containers of the type adapted for shipment of such commodities as eggs, fruits and vegetables, and has for its principal object the provision of means for securing the parts of such containers together in the desired relationship, but which means are readily removable to permit folding of the container to a flat condition for empty shipment.

My present application consists of certain species of the invention originally disclosed in my copending application Serial No. 717,570, filed December 20, 1946, together with certain additional forms and modifications of the invention therein disclosed; the present application is therefore denoted as a continuation-in-part of the aforesaid application.

An object of my invention additional to that above noted is to provide container wall fastening means which may be utilized without the use of any tools whatever, either in applying or removing the fasteners, and which are moreover adapted to perform certain other functions such as the provision of convenient handles on the outer walls of the containers, without any of the usual complications required in multiple use devices of this general kind.

A still further object of the invention is to devise fully preformed fastening means of the type described which are very simply formed of low-cost material, and which may therefore be supplied at an absolute minimum of cost. An ancillary object of the invention is to provide fasteners whose use does not complicate the container structure as such; more particularly, the fasteners of my invention require only simple slots in certain of the panel members of the containers, which slots can readily be incorporated during the manufacture of the box, without expensive die-cutting operations; for example, the slots required may readily be formed during the operation of the conventional rotary fibreboard cutting, printing and slotting machines.

Still another object of my present invention is to devise types of combined securing elements and handles which have portions adapted to clamp between them the plies or walls of a box-wall structure, but in which no part of the fastener elements is required to extend below the horizontal axis of the slot in the wall panels, or below what I refer to as the line of perforation of such panels. Moreover, these novel arrangements result in fasteners whose extremities terminate substantially in or within the area of the slot or perforation. Such forms of fastener are quite simple to fabricate, and if of proper shape, provide a very secure fastening or handle means which is easily placed in position, but which cannot be accidentally dislodged.

A further object of the present invention is to provide, for use in connection with fasteners whose extremities are terminated in or within the area of the panel slot or perforation, an anchor or bearing plate which assist in maintaining the fastener in its preferred position, and positively prevents removal thereof except by the specific intent of the user. Such anchor or bearing plates therefore operate to key the fastener in position with respect to the box or container panels.

Figures 13, 14, 15:
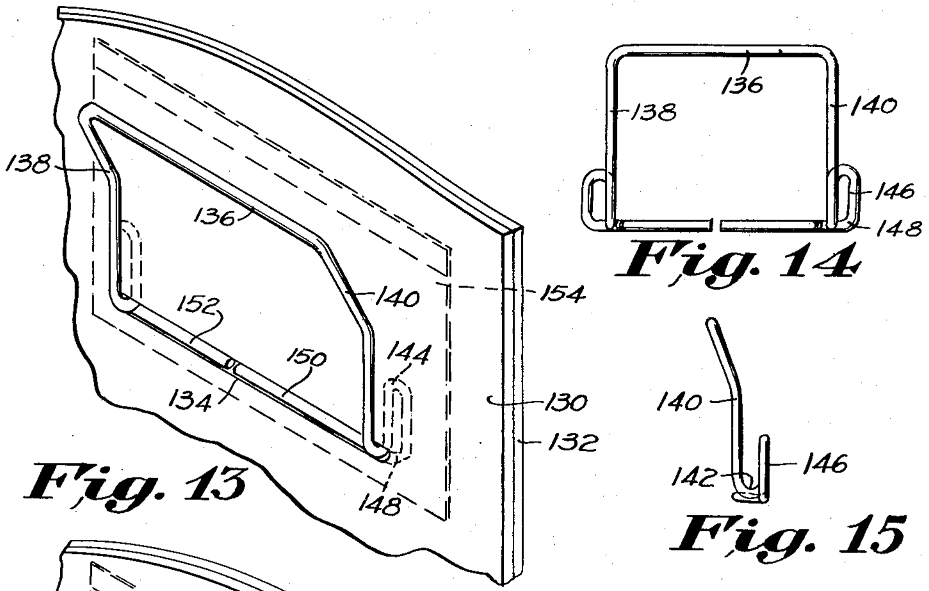
Figure 16:
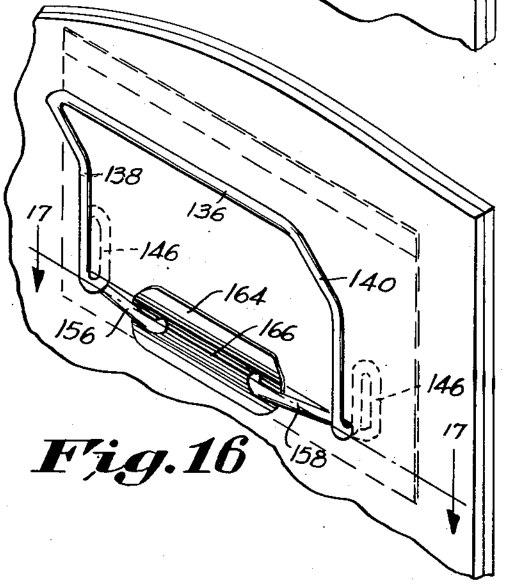
Figure 17:
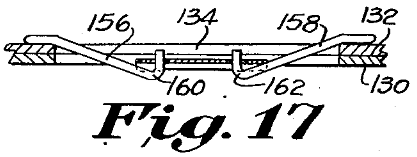
Figure 18:
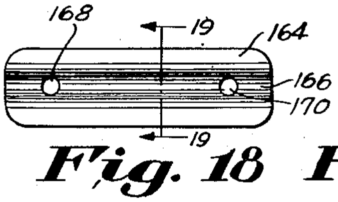
Figure 19:
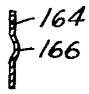
Figure 20:
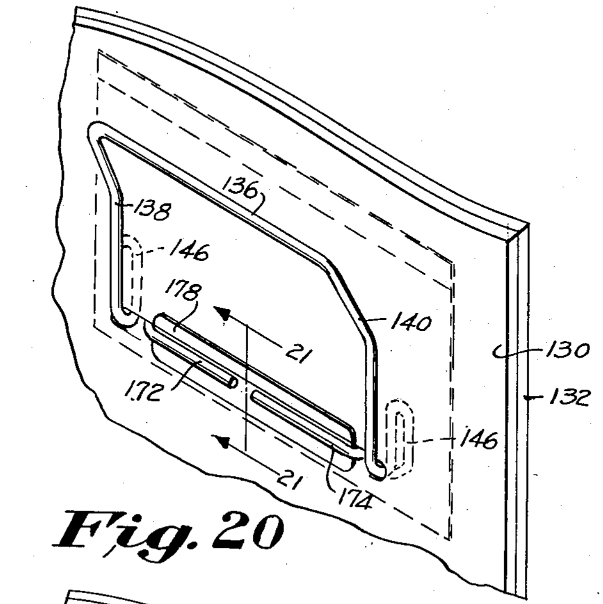
Figure 21:
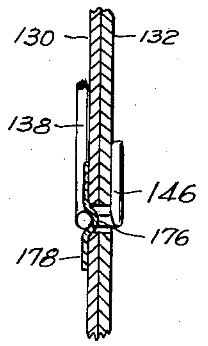
Figure 22:
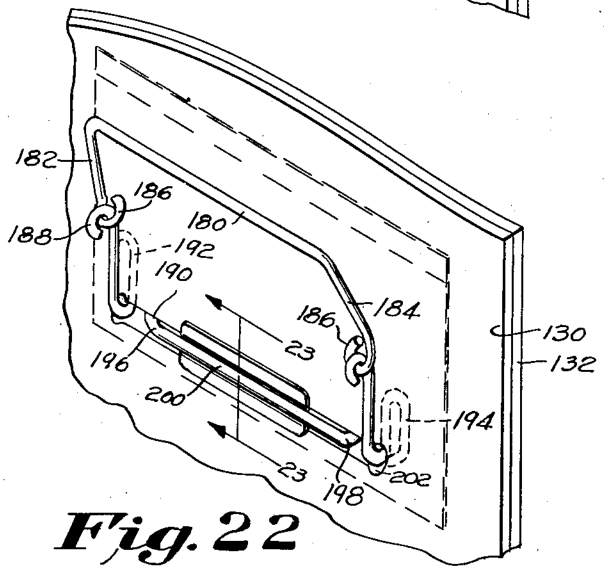
Figure 23:
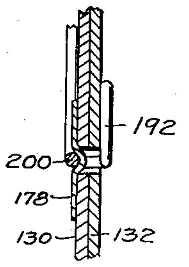
Figure 24:
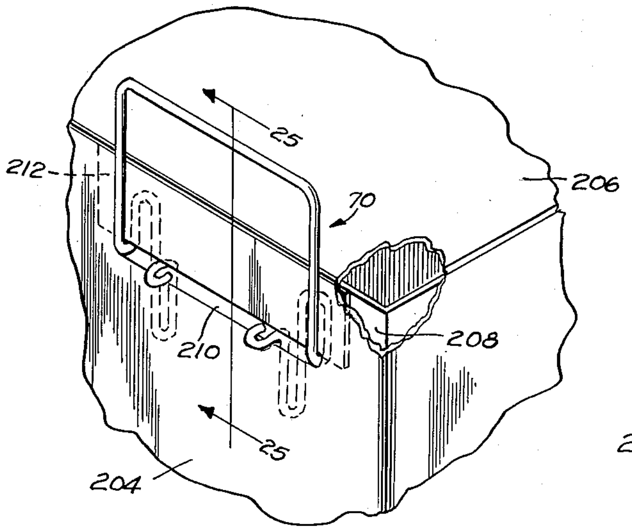
Figure 25:
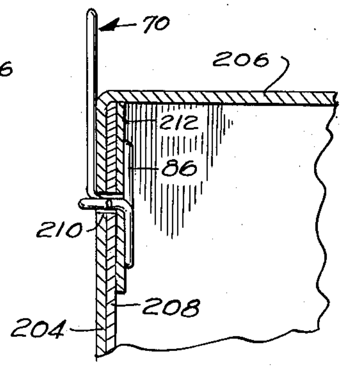
Figure 26:
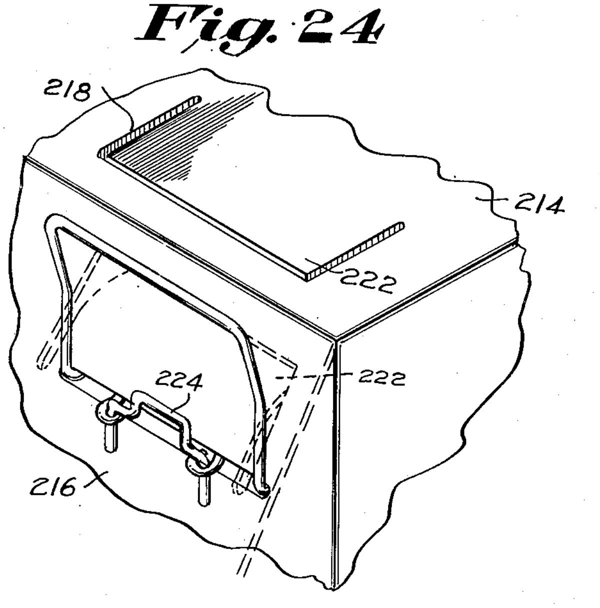
Figure 27:
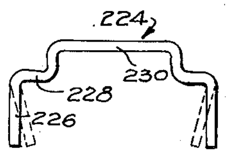

My invention will best be understood by referring to the following detailed specification of certain preferred embodiments thereof, taken in connection with the drawings, in which:

Fig. 1 is an isometric view of a portion of a two-ply box end panel to which has been secured one form of the invention, Fig. 2 is a front elevation of the fastener of Fig. 1, Fig. 3 is a side elevation thereof, Fig. 4 is a front elevation of a modified form of the fastener shown in Fig. 1, Fig. 5 is a side elevation thereof, Fig. 6 is a view similar to Fig. 5, but of a slight further modification thereof, Fig. 7 is a front elevation of another form of the invention, Fig. 8 is a side elevation thereof, Fig. 9 is a view similar to Fig. 8 but of a modified form of the same structure, Fig. 10 is a perspective view of the application of still another form to a carton end wall, Fig. 11 is a view similar to Fig. 10 of a further modification, showing application of a reenforcing strip, with a carton cover flap folded against the carton wall, Fig. 12 is a view similar to Fig. 10 but of still another form of the invention, Fig. 12–A is a view similar to Fig. 12, but showing the fastener terminated in open loops or eyes lying within the slot of the container wall, Fig. 13 is an isometric view of the application to a box panel of a fastener whose straight ends terminate in the area of perforation of the panel, Fig. 14 is a front elevation thereof, Fig. 15 is a side elevation thereof, Fig. 16 is a view similar to Fig. 13 illustrating a second form of this generic construction, together with an auxiliary bearing or anchor plate therefor, Fig. 17 is a sectional view taken on line 17—17 of Fig. 16, Fig. 18 is a front elevation of the bearing or anchor plate, Fig. 19 is a sectional view on line 19—19 of Fig. 18, Fig. 20 is an isometric view of a still further modification of the invention, using a different form of bearing plate, Fig. 21 is a sectional view on line 21—21 of Fig. 20, Fig. 22 is an isometric view of still another form of the invention, provided with an articulated bail type of handle portion, Fig. 23 is a sectional view taken on line 23—23 of Fig. 22, Fig. 24 is an isometric view of the fastener of Fig. 10 applied to a carton sidewall of which an integral hinged part serves as a carton lid member, and Fig. 25 is a sectional view on line 25—25 of Fig. 24, Fig. 26 is an isometric view of a handle on a container having a slotted lid arranged to give access to the handle when the lid is folded down, and Fig. 27 is a front elevation of a fastener element adapted for use in positively securing the handles, for example of Fig. 26, against accidental removal.

Referring now to Fig. 1 of the drawings, there is shown a broken away portion of one two-ply end of a fiberboard container. The two plies are designated 10 and 12, and each has an elongated slot therein, designated broadly as 14. In order to secure the two panels against movement either away from one another or in a sliding fashion, a fastener 16 is provided, and preferably formed of a single piece of such material as stiff wire. As shown in Figs. 2 and 3, fastener 16 comprises a connecting leg 18 and two depending legs 20 and 22, these parts being substantially coplanar and defining a U-shaped or stirrup-shaped portion adapted to engage the outer surface of panel 10 when inserted through slot 14. Each of legs 20 and 22 turns in a direction perpendicular to the plane of the stirrup portion to provide work or slot-penetrating portions 24 and 26, and then each turns outwardly to form a loop (28 and 30 respectively), the loops being coplanar and approximately parallel to the plane of the stirrup portion. As shown best in Fig. 3, the normal or rest plane of the loops 28 and 30 is slightly inclined to the plane of the stirrup, to provide a tension grip upon the panels 10 and 12 when the clip or fastener is inserted.

If it is desired to cover the loops 28 and 30 on the inside of the container, as well as to seal the exposed portions of slot 14, a strip of adhesively-coated paper 32 (Fig. 1) may be pasted over the projected area of the parts to be covered. If desired to permit ready re-use of the container and facilitate insertion and removal of the fastener, such strip may be adhesively secured only in the area designated 34, being normally held in covering position by gravity or pressure exerted by the contents, but readily swingable to a position giving access to the fastener and slot.

It will be readily understood that, if the fastener 16 is inserted as shown in Fig. 1, and if panel 10 constitutes the outer panel of a container, then the leg 18 constitutes a convenient handle for the container, a duplicate fastener at the other end of the container providing a convenient means for handling the filled case. In other words, mere insertion of the fasteners as a matter of container assembly may simultaneously provide outside handle members. The springy nature of the wire of which the fasteners are preferably fabricated enables the leg portion 18 to be grasped and pulled somewhat away from the outer surface of the container for a firm finger grip, but, as described hereinafter, it is also feasible to provide a permanent outwardly-deflected location of leg 18 where the handle feature is particularly to be emphasized, without in any way lessening the value of the member as a fastener.

The fastener 16 described above is constituted by portions of substantial area or projected area which lie respectively in slightly spaced planes approximately parallel to one another, although before use, as mentioned, such planes may be slightly inclined to one another in the interest of a firm grip. Connecting these portions are work or slot-penetrating members 24 and 26 which are short members adapted to pass through the elements to be secured together. Thus, the contact between the gripping portions (e. g., the portion made up of legs 18, 20 and 22 and the portion made up of loops 28 and 30) and the surfaces to be secured is distributed over a relatively extensive area of such surfaces, which eliminates all danger of tearing or distorting the material of the panels, and increases the effectiveness of the fastening action. Further, the fastener is formed of a single piece of material, such as wire, whose terminal areas are turned closely against adjacent non-terminal portions to provide a structure which is free from sharp edges or corners which might cause injury to the user, the container or to the contents of the case.

The principles of the invention as outlined above may, of course, be satisfied by designs which are specifically different. Certain of these modifications are described below, but it is to be understood that the description of specific forms herein is not to be construed to exclude other equivalent forms which come within the scope of such principles, as defined in the claims appended hereto.

Figs. 4 and 5 illustrate a modified form of the invention which is adapted for use in the same manner as the form of fastener just described. However, in this embodiment, the vertical leg members 36 and 38, which are joined by a horizontal leg 40, terminate in slot-penetrating portions such as 42 (Fig. 5) which then diverge outwardly as at 44 and 46 sufficiently so that, when upward and inward loops 48 and 50 are formed, these loops lie entirely outside the projected area of portions 36, 38 and 40. As shown in Fig. 6, each of the vertical leg portions 36 and 38 may be given a slight outward bend as at 52, whereby the horizontal leg 40′ will be spaced from the outer wall of the container to aid in providing a convenient grip for the fingers when the device is used as a handle.

In the forms shown in Figs. 7 to 9, the handle-forming stirrup comprises a central leg 54, depending legs 56 and 58 which turn rearwardly to pass through the carton slots as at 60 of Fig. 8, thence upwardly approximately parallel to the portions 56 and 58, and then reversely downward as at 62 and 64 of Fig. 7. The ends of the pieces are then turned toward one another as at 66, 68, terminating closely adjacent one another as best shown in Fig. 7. It will be seen that in this form of the invention there are in effect two stirrup portions 54–58 and 62–68, and that these two portions lie in planes slightly inclined to one another for contact with the carton-wall forming panels. As indicated in Fig. 9, the portions 56 and 58 may be bent between their ends to form the outstanding handle grip mentioned above.

Fig. 10 is a perspective illustration of a somewhat modified form of combined handle and fastener 70, shown as used in combination with a multi-ply wall composed of panels 72 and 74. Both of the plies of the wall structure are slotted or perforated as at 76, and through this slot is passed the stirrup-shaped handle portion of the handle, comprising a horizontal portion 78 and depending leg portions 80 and 82. Leg 82 is bent rearwardly as at 84 to pass through slot 76, thence upwardly as at 86 and thence reversely downward as at 88 and then again upwardly as at 90. The parts 86, 88 and 90 lie in a common plane, and the length of portion 84 is so chosen that parts 86 to 90 closely engage the opposite surface of the wall member. The portion 90 terminates in a forwardly disposed loop 92 adapted to pass into or through the slot 76. Hence, the fastener or handle leg engages the material defining the top edge of slot 76 at a plurality of spaced points, increasing the resistance to tearing out of such material. The inherent resilience of the springy wire from which the handle is constructed enables the device to be readily inserted into the slot, yet provides a firm grip upon the opposite surfaces of the wall. Furthermore, the dual engagement at each side restricts removal of the fastener by either upward pull or downward pressure thereon. Intentional removal, however, is achieved by pressing outwardly on the panel material at the lower edge of slot 76 to disengage loops 92 from the edges of the slot, whereupon the fastener may be slid out of engagement just as are the simpler forms earlier described herein.

Inasmuch as the parts associated with leg 80 are bent into a mirror image of the parts associated with leg 82, it is deemed unnecessary to describe these similar parts in detail.

Fig. 11 shows a modification of the fastener 70, generally designated in that figure by numeral 94. The depending legs 96 and 98 are of the same shape as described in connection with Fig. 10, except that the ultimate end of each leg is turned toward the end of the other, as indicated at 100 and 102, the terminals 104 and 106 lying just beneath the material defining the upper edge of slot 76, and in the plane of one or the other of the wall elements. The illustration of this form shows the handle applied to a single-ply wall member having a usual form of closure flap hingedly connected thereto at its upper edge. Thus, any usual form of fibreboard container may be converted into a handled container merely by providing appropriate slots in the end wall panels and top closure flaps. As so used, of course, the flaps may be turned either inwardly or outwardly with respect to the container to enable insertion of the handle member through the registering slots, but the handle portion will always, of course, lie outside of the container wall.

In order to provide increased strength and resistance to tearing of panel 110, particularly where the container material is corrugated board, rather than fibreboard, a reenforcing strip 112 of cardboard, chipboard, fibreboard or the like may be inserted as indicated, with one edge in the fold connecting panel 110 and closure flap 108, the lower edge passing along the top edge of slot 76. Such a strip greatly increases the durability of the container wall, by increasing the area over which the stress applied by handle 94 is distributed, and hence increases the resistance to tearing of the material along the top edge of the slot.

A further modification is shown in Fig. 12, the depending legs 114 and 116 of the fastener passing rearwardly through the slot 76 as at 118, thence upwardly as at 120, diagonally downward as at 122 to a point below the level of slot 76, thence again upwardly as at 124, and terminating in a short forwardly bent portion 126 adapted to pass into or through slot 76. The latter portion provides the spaced points of contact with the top edge of the slot as described above. It will be understood that the opposite leg is formed in a similar (reversely symmetrical) fashion. As indicated at 128, the connecting portion between legs 114 and 116, which forms the finger grip of the handle, may be spaced away from the wall panel, as by bending the legs 114 and 116 intermediate their ends, to facilitate positive engagement of the fingers with such handle portion. This construction may also be applied to the combined handle and fasteners of Figs. 10 and 11, and is of particular value where the handle portion does not extend above the top edge of the container. In the latter circumstances, as indicated in Fig. 11, such a spaced-away handle portion would be unnecessary.

Fig. 12–A of the drawings illustrates a further slight modification of the form of Fig. 12, in that the terminals 126′ are formed into horizontal loops which project through the slotted portion 76. As in the Fig. 12 form, this construction provides a minimum of four spaced points of contact between the handle member and the edges of the slot, and in addition the looped terminals are adapted to cooperate with a retainer whose legs pass through said loops, as described below in connection with Figs. 26 and 27. Moreover, the form of Fig. 12–A differs from that of Fig. 12 in that the portions 122 and 124 of the latter are omitted, so that no portion of the handle member of Fig. 12–A extends below the axis of the slot. Since this reduces the number of bends in the handle member, its manufacture on standard wire-bending machines is considerably simplified.

Referring now to Figs. 13 to 23 of the drawings, I have shown a series of handle elements combining features of securing together two or more plies of carton or container material, and all characterized by the fact that no part of such element lies below a horizontal line passing through the slot or axis of perforation of the plies of container material.

The form of the invention shown in Figs. 13 to 15 is shown as applied to a multi-ply wall panel comprising superimposed panels 130 and 132 provided with mating slots designated by numeral 134. A reenforcing strip of the type shown as 112 in Fig. 11 may serve in lieu of panel 132. The handle or connecting leg portion of the fastener is designated 136, and the downwardly depending legs are 138 and 140. As here shown, these legs 138 and 140 are bent intermediate their ends to space the bail or connecting leg 136 from the panel surface, and at their lower ends turn rearwardly to pass through the slot 134, this inward bend being designated 142 in Fig. 15. After passing through the slot, the material or wire of leg 140 is bent upwardly as at 144 for a short distance, and thence outwardly to form a panel-engaging loop 146 lying outside the profile of the portions 136, 138 and 140. The wire then returns inwardly, as indicated at 148, so that it may be bent forwardly into the slot 134 and from this point lies substantially in or within the plane of one or the other of the panels 130 and 132, as at 150. The opposite leg of the fastener, having been shaped in a reversely symmetrical fashion, has its terminus 152 extending nearly to the end of portion 150 of the opposite leg. A cover flap 154, similar to flap 32 if Fig. 1 may be provided interiorly of the container, if desired, as described in connection with a previous embodiment.

Figs. 16 to 21 illustrate two further modifications of a portion of the structure just described, and since the alterations in so far as the fasteners themselves are concerned have to do only with the disposition of the terminals of the fasteners, these figures have been shown with the reference numerals used in connection with corresponding portions of Figs. 13 to 15, except where there are departures from such previously described form.

In Figs. 16 and 17, bail portion 136, leg portions 128 and 140 and loops 146 may be formed just as already described, but the termini of the two legs which extend toward one another, as at 156 and 158, pass slightly forward of the surface of panel 130 and each is then sharply bent as at 160, 162 to reenter the slot 134. In order to anchor these termini firmly in place, and to provide an increased bearing area between them and the edges of slot 134, I provide a strip of metal 164 or the like, in the form of a plate which has been deformed to provide a longitudinally extending shallow recess 166 which therefore dips back into the slot 134 when the strip 164 is placed with its rear face abutting the material of panel 130. This strip 164 is also provided with a pair of spaced apertures 168 and 170 located to receive the rearwardly turned hooks on the termini 160 and 162.

The construction of the strip or plate 164 is best shown in detail in Figs. 18 and 19, wherein the location of the apertures 168 and 170 is clearly shown as within the area of the formed longitudinal groove or recess 166.

Figs. 20 and 21 illustrate a modification in which the terminals of the fastener extend directly toward one another exactly in conformity with the disclosure of Fig. 13, but, as indicated at 172 and 174, are located slightly forward of the face of panel 130. In this position, these terminals lie within a groove or formed depression 176 in a strip 178 similar to strip or plate 164 of Figs. 16 to 19. In this case, of course, the strip or plate may be unapertured, since the terminals of the fastener do not pass through it as previously described. However, I contempalte that a single form of such plate may be used with either of the arrangements, that is, Figs. 16 or 20, and since the presence of apertures in the plate would not be objectionable even where the fastener ends are not to pass through the plate, such single plate may be formed with the apertures, thus enabling a single form of plate to be used in either connection, and thereby reducing the number of different manufactured parts required to implement the various arrangements.

In Figs. 22 and 23 I have illustrated a slightly different form of combined handle and fastener in which provision is made for facilitating a firm grasp of the bail portion of the handle by actual encirclement with the fingers of a hand, rather than by the finger-tip engagement permitted by the forms earlier described. In this form of the invention, the connecting portion or bail member 180 has relatively short depending legs 182 and 184, each of which terminates in a formed loop or eye 186 engaging the loop or eye 188 formed at the ends of a second and distinct piece of wire which thereafter passes through the slot 190 in the panels 130 and 132 and is formed with inner-panel engaging loops 192 and 194. The ends of these loops return into or through the slot 190 as at 196 and 198 in a manner corresponding to the terminals 172 and 174 of Fig. 20, but as plainly shown in Fig. 22 these ends are actually portions of a single continuous length of wire 200 of which the bottom half of this fastener is formed. A plate 178 is again used to anchor this fastener in place against removal back through slot 190. In order to facilitate the insertion of this fastener, slot 190 in this instance is enlarged at its ends, as indicated at 202, to pass the loops or eyes 186 and 188.

In use, the bail or handle portion 180 and legs 182, 184 are inserted through the slots in the panels 130 and 132 from within the carton or container, and the remainder of the fastener pulled into place by pulling upon portion 180, which engages loops 192 and 194 with the surface of the inner panel. The anchor plate 178 is then slipped into position, preventing accidental withdrawal of the fastener back through the slot.

Since the bail portion 180 and legs 182, 184 are freely hinged by the eyes 186 and 188, a firm finger grip may be obtained merely by swinging the handle portion sufficiently away from the outer wall surface to enable the fingers to encircle portion 180.

Figs. 24 and 25 illustrate the fastener of Fig. 10 as applied to one end of a container having a closure panel or flap integral with the end or side wall which receives the fastener. As shown in these figures, the outer ply 204 of the carton end or side wall extends over a portion of the container to form a closure flap 206, and fastener 70 operates to secure to panel or ply 204 an inner ply 208 which may, for example, be one panel of a liner member extending also around other walls of the container. The combined fastener and handle is preferably inserted within a slot 210 cut through both of the plies, and so spaced from the top of the container that the handle or bail portion of fastener 70 extends above or comes below the level of the box top as is desired. It will be understood that a similar equivalent fastener and handle member is attached to the opposite end or side wall of the container, to provide convenient grips for the user's hands.

As best shown in the sectional view of Fig. 25, a reenforcing strip 212 may be gripped between the inner loops 86 of fastener 70 and the inner surface of the inner ply 208, and this strip 212 preferably extends upward so as to contact and be held in place by the closed closure panel or flap 206. In a single wall end, that is, if the inner ply 208 were omitted, the reenforcing strip 212 would serve in a similar way. Obviously, other of the specific forms of handle and fastener units herein disclosed may be applied in the fashion here shown in connection with handle 70, and a reenforcing strip either between the plies of a wall structure, or lying inside the inner wall as in Fig. 25, may be provided with the other handle forms.

As shown in Fig. 26, where the top panel 214 extending from adjacent the upper edge of the handle-receiving panel 216 constitutes a pivoted cover member, said panel 214 may be provided with an opening 218 located so as to register with the profile of handle 221 when the panel 214 is pivoted down over the outside of the carton wall 216. Opening 218 may be plain, or as shown, may have a tongue 222 adapted to close the opening when the cover panel 214 is in its covering position. This feature is illustrated also in Fig. 9 of my said application Serial No. 717,569.

Figs. 26 and 27 also illustrate an auxiliary securing clip member 224, formed of bendable wire to the profile shown in Fig. 27, to provide a pair of downwardly extending locking leg portions one of which is marked 226 in Fig. 27, shoulders turned in from said legs as indicated at 228, and a central connecting portion 230 lying generally above the level of the shoulders. When used in combination with any of the combined handles and fasteners which provide loops extending outside the wall surface in the neighborhood of the slot through the wall, as illustrated in Fig. 26, the shoulders 228 of the clip rest upon said loops, and the portions of the clip above and below the slot bear against the container wall and positively prevent withdrawal of the handle and fastener except after removal of said auxiliary clip.

It will have been observed that certain of the various forms of the invention shown in the drawings utilize fastener and handle elements whose U-shaped portions lie strictly in a common plane (as in Fig. 1, for example), while other forms utilize fasteners in which the bail portion of the handle is slightly spaced from the common plane of the leg portions, as by bending of the leg portions, as shown in Fig. 6. In both of these types, however, all parts of the U-shaped portions lie sufficiently in a common plane so as to permit ready insertion of the U-shaped portion through the slotted walls, and hence in all cases the U-shaped portion may be said to lie "substantially" in a common plane. Hence, the corresponding terminology in the appended claims is to be understood as covering both of these slight variants of the generic term "U-shaped."

In all of the forms of the invention herein disclosed, it will be noted that the insertion of the fastener and handle element involves inserting the U-shaped portion of the element through an elongated slit or open slot in the container wall structure. I have found that this arrangement is of the greatest importance, in that it permits a complete prefabrication of the fastener elements, which, if used with wall structures having merely spaced perforations, as is common in this art, would have to be formed at least in part after insertion in the container walls. My fastener elements are in all cases preformed completely, with consequent substantial advantages from the point of view not only of the cost of the fasteners at the point of use (that is, actually in place on the containers), but in simplicity and convenience of use even by relatively untrained operators.

I have disclosed herein certain preferred embodiments of my invention and the best mode known to me of applying the same, but I wish it to be understood that changes and modifications in the details thereof may be made by those skilled in the art, without departing from the scope of my invention as defined in the appended claims.

I claim:

1. In combination with the wall of a container having a slotted aperture therein, a preformed unitary combination fastener and handle member formed of wire and adapted to be inserted in part through said aperture, said inserted part being U-shaped and formed to lie in part upon the surface of said wall and in part inclined at an angle thereto, the penetrating parts comprising spaced members of a length approximately equal to the thickness of the wall, the projected ends of said penetrating parts, except the extreme ends thereof, being adapted to form a dual clip with the inserted part and formed to lie in close contact with the other surface of said wall, said extreme ends being bent outwardly so as to lie when in use as elements projecting through the slotted aperture in the container wall.

2. In combination, a container wall having an elongated slot; a fastener comprising a U-shaped portion lying upon the outer surface of said wall and spaced coplanar loops lying upon the inner surface of said wall, said loops terminating respectively in portions re-entering said slot; and a locking anchor element receiving the terminations of said loops and formed to engage the walls of said slot and to lie upon the outer surface of said wall.

3. A unitary preformed wire fastener and handle member adapted for use as a means for handling and carrying fiber board containers, said fastener and handle member comprising a U-shaped handle grip segment formed with two legs and a connecting portion, said leg portions adjoining the connecting portion being bent outwardly and obliquely from the plane of the remaining base portions of said legs, a work or slot penetrating member being formed at the ends of said legs at right angles to the plane of said legs and turned in reverse direction, an upturned segment at the end of each of said work penetrating members, said upturned segments being looped upwardly and outwardly from each other within a plane substantially parallel to the plane of the base portions of the handle grip segment, said outwardly looped portions extending in part outside the profile of the U-shaped handle grip member, and having at least one extension directed inwardly and a portion thereof lying parallel to the connecting portion of said handle grip segment and generally within the plane of the base portions of the legs of said handle grip segment.

4. In combination with the wall of a container having a slotted aperture therein, a preformed unitary combination fastener and handle member formed in accordance with claim 3, a reinforcing ply on the inside face of the container wall, the said ply being apertured to register with the aperture of said wall, and the handle member of said preformed fastener and handle member being inserted through the slotted aperture in said reinforcing ply and said container wall.

5. The combination as set forth in claim 4 in which the said reinforcing ply extends at least from the upper edge of said aperture in said wall to the upper edge of said wall.

6. A device as set forth in claim 3 in which the work penetrating members lie in a common plane and in which the end portions of each of said upwardly and outwardly, upturned looped segments are formed to lie between the work penetrating members and in said common plane.

7. The device as set forth in claim 6 in which said end portions are mutually adjoining and in linear alignment with each other.

8. A device as set forth in claim 7 in which the leg portions of the handle grip segment are bent by means of hinges.

9. A device as set forth in claim 3 in combination with the wall of a container having a slotted aperture therein, the handle grip segment of said device being inserted through the slotted aperture in said container wall; and, a locking anchor element receiving the inner extremity of each of the outwardly looped portions of said device and formed to engage the walls of the slotted aperture in said container wall and to lie upon the outer surface of said wall.

10. The invention in accordance with claim 9 in which the extreme end portion of the inner extremity of each of the said outwardly looped portions of the fastener and handle member terminate in an inwardly turned end located within spaced apertures in the said locking anchor element.

11. A device as set forth in claim 3 in combination with the wall of a container having a slotted aperture therein, the handle grip segment of said device being inserted through the slotted aperture in said container wall; and, a strip of adhesively-coated paper secured at least in part to the inner surface of the container wall in the area above and about the said slotted aperture and covering said slotted aperture and the projected portions of the said device lying upon the inside wall of the container.

ROY C. POTTS.

REFERENCES CITED

The following references are of record in the file of this patent:

UNITED STATES PATENTS

| Number | Name | Date |
|---|---|---|
| 501,013 | Lang et al. | July 4, 1893 |
| 778,711 | Rundle et al. | Dec. 27, 1904 |
| 851,595 | Howell | Apr. 23, 1907 |
| 1,241,542 | Miller | Oct. 2, 1917 |
| 1,999,461 | Kells | Apr. 30, 1935 |
| 2,011,407 | Hirsch | Aug. 13, 1935 |
| 2,017,782 | Bacon | Oct. 15, 1935 |
| 2,050,911 | Adams | Aug. 11, 1936 |
| 2,132,638 | Mohler | Oct. 11, 1938 |
| 2,222,358 | Olsen | Nov. 19, 1940 |
| 2,296,229 | Powell | Sept. 15, 1942 |